United States Patent
Hotelling et al.

(10) Patent No.: US 9,477,263 B2
(45) Date of Patent: Oct. 25, 2016

(54) ELECTRONIC DEVICE WITH CHIP-ON-GLASS AMBIENT LIGHT SENSORS

(75) Inventors: Steven P. Hotelling, San Jose, CA (US); Dong Zheng, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1363 days.

(21) Appl. No.: 13/283,446

(22) Filed: Oct. 27, 2011

(65) Prior Publication Data

US 2013/0106813 A1    May 2, 2013

(51) Int. Cl.
G02F 1/1335    (2006.01)
G06F 1/16    (2006.01)
G06F 1/32    (2006.01)
G09G 3/36    (2006.01)

(52) U.S. Cl.
CPC ........... *G06F 1/1626* (2013.01); *G06F 1/1637* (2013.01); *G06F 1/1684* (2013.01); *G06F 1/3265* (2013.01); *G09G 3/3648* (2013.01); *G09G 2360/144* (2013.01); *Y02B 60/1242* (2013.01)

(58) Field of Classification Search
CPC .. G06F 1/1626; G06F 1/1637; G06F 1/1684; G06F 1/3265; G09G 3/3648; G09G 2360/144; Y02B 60/1242
USPC ............................................. 345/207; 349/12
See application file for complete search history.

(56) References Cited

U.S. PATENT DOCUMENTS

| | | |
|---|---|---|
| 6,339,429 B1 | 1/2002 | Schug |
| 6,459,436 B1 | 10/2002 | Kumada |
| 7,153,720 B2 | 12/2006 | Augusto |
| 7,460,196 B2 | 12/2008 | Kim |
| 7,586,479 B2 | 9/2009 | Park et al. |
| 7,825,891 B2 | 11/2010 | Yao et al. |
| 7,957,762 B2 | 6/2011 | Herz et al. |
| 7,960,682 B2 | 6/2011 | Gardner, Jr. |

(Continued)

FOREIGN PATENT DOCUMENTS

| | | |
|---|---|---|
| EP | 1335430 | 8/2003 |
| WO | 00/41378 | 7/2000 |

(Continued)

OTHER PUBLICATIONS

Zheng et al., U.S. Appl. No. 13/241,034, filed Sep. 22, 2011.

(Continued)

*Primary Examiner* — Charles Chang
(74) *Attorney, Agent, or Firm* — Treyz Law Group, P.C.; G. Victor Treyz; Kendall P. Woodruff

(57) ABSTRACT

An electronic device may have a display with a brightness that is adjusted based on ambient light data from one or more ambient light sensors. An ambient light sensor may be formed from a semiconductor substrate such as a silicon substrate. Sensor structures may be formed in the silicon substrate. Conductive vias or other conductive paths may be used to interconnect sensor structures on a frontside surface of the ambient light sensor to contacts on a backside surface of the ambient light sensor. The ambient light sensor may be mounted on a substrate layer in the electronic device. The substrate layer may be a planar layer of glass or plastic such as a transparent display layer. The contacts of the ambient light sensor may be mounted to corresponding contacts on the surface of the substrate layer. The substrate layer may be a thin-film transistor layer in a liquid crystal display.

17 Claims, 11 Drawing Sheets

(56) References Cited

U.S. PATENT DOCUMENTS

| | | |
|---|---|---|
| 8,031,164 B2 | 10/2011 | Herz et al. |
| 8,194,031 B2 | 6/2012 | Yao et al. |
| 8,384,003 B2 | 2/2013 | Gardner, Jr. |
| 8,456,410 B2 * | 6/2013 | Kalnitsky ............ H05B 33/0854 315/158 |
| 2003/0189211 A1 | 10/2003 | Deitz |
| 2003/0189586 A1 | 10/2003 | Vronay |
| 2004/0036820 A1 | 2/2004 | Runolinna |
| 2004/0095402 A1 | 5/2004 | Nakano |
| 2005/0051708 A1 | 3/2005 | Hotelling |
| 2005/0203697 A1 | 9/2005 | Dalgleish |
| 2005/0219197 A1 | 10/2005 | Pasqualini et al. |
| 2007/0236485 A1 | 10/2007 | Trepte |
| 2007/0268241 A1 | 11/2007 | Nitta et al. |
| 2008/0284716 A1 | 11/2008 | Edwards |
| 2008/0284934 A1 * | 11/2008 | Umezaki et al. ................. 349/43 |
| 2009/0027371 A1 * | 1/2009 | Lin et al. ....................... 345/207 |
| 2009/0085485 A1 | 4/2009 | Young |
| 2009/0135115 A1 * | 5/2009 | Sakamoto ............ G02F 1/1336 345/84 |
| 2009/0174647 A1 | 7/2009 | Chen et al. |
| 2009/0207194 A1 * | 8/2009 | Wang ................... G06F 3/0421 345/690 |
| 2010/0079426 A1 | 4/2010 | Pance et al. |
| 2010/0090996 A1 | 4/2010 | Chou et al. |
| 2010/0127280 A1 | 5/2010 | Katoh et al. |
| 2010/0177060 A1 | 7/2010 | Han |
| 2011/0199349 A1 | 8/2011 | Katoh |
| 2011/0234302 A1 | 9/2011 | Utsunomiya et al. |
| 2011/0273377 A1 | 11/2011 | Merz |
| 2011/0298746 A1 * | 12/2011 | Hotelling ............. G06F 3/0418 345/174 |
| 2012/0020000 A1 * | 1/2012 | Mathew ................ G06F 1/1637 361/679.26 |
| 2012/0086010 A1 * | 4/2012 | Giffard ................... H01J 31/26 257/59 |
| 2012/0218239 A1 | 8/2012 | Yao et al. |
| 2012/0280904 A1 * | 11/2012 | Skurnik ................ G06F 3/0416 345/156 |
| 2012/0319966 A1 * | 12/2012 | Reynolds ....................... 345/173 |
| 2013/0076712 A1 * | 3/2013 | Zheng et al. .................. 345/207 |

FOREIGN PATENT DOCUMENTS

| | | |
|---|---|---|
| WO | 02/37454 | 5/2002 |
| WO | 2007/069107 | 6/2007 |

OTHER PUBLICATIONS

Chiang et al., "Integrated Ambient Light Sensor With Nanocrystalline Silicon on a Low-Temperature Polysilicon Display Panel", IEEE Transactions on Electron Devices, vol. 56, No. 4, pp. 578-586, Apr. 2009.

Wuu et al., "A Leading-Edge 0.9μm Pixel CMOS Image Sensor Technology with Backside Illumination: Future Challenges for Pixel Scaling (Invited)", Taiwan Semiconductor Manufacturing Company, 2009.

Shedletsky et al., U.S. Appl. No. 13/732,966, filed Jan. 2, 2013.
Jong et al., U.S. Appl. No. 13/686,746, filed Nov. 27, 2012.
Land et al., U.S. Appl. No. 13/746,549, filed Jan. 22, 2012.
Yin, U.S. Appl. No. 13/628,388, filed Sep. 27, 2012.
Gardner Jr., U.S. Appl. No. 13/771,779, filed Feb. 20, 2012.
Zheng, U.S. Appl. No. 13/738,908, filed Jan. 10, 2013.
Zheng, U.S. Appl. No. 13/678,349, filed Nov. 15, 2012.

\* cited by examiner

US 9,477,263 B2

ELECTRONIC DEVICE WITH CHIP-ON-GLASS AMBIENT LIGHT SENSORS

BACKGROUND

This relates to sensors and, more particularly, to ambient light sensors for electronic devices.

Cellular telephones and other portable devices with displays such as tablet computers sometimes contain ambient light sensors. An ambient light sensor can detect when a portable device is in a bright light environment. For example, an ambient light sensor can detect when a portable device is exposed to direct sunlight. When bright light is detected, the portable device can automatically increase the brightness level of the display to ensure that images on the display remain visible and are not obscured by the presence of the bright light. In dark surroundings, the display brightness level can be reduced to save power and provide a comfortable reading environment.

With conventional devices, ambient light sensors are mounted on flexible printed circuits. It can, however, be challenging to incorporate ambient light sensors into an electronic device using this type of configuration. Space is often limited in electronic devices, which limits the room available for ambient light sensors and flexible printed circuit substrates. Cost and complexity are also important considerations.

It would therefore be desirable to be able to provide improved ambient light sensor systems for electronic devices.

SUMMARY

An electronic device may have a display with a brightness that is adjusted based on ambient light data from one or more ambient light sensors. Ambient light sensors may be mounted under ambient light sensor windows formed in an inactive portion of a display.

An ambient light sensor may be formed from a semiconductor substrate such as a silicon substrate. Sensor structures may be formed in the silicon substrate. Conductive vias or other conductive paths may be used to interconnect sensor structures on a frontside surface of the ambient light sensor to contacts on a backside surface of the ambient light sensor.

The ambient light sensor may be mounted on a substrate layer in the electronic device. The substrate layer may be a planar layer of glass or plastic such as a transparent display layer. The contacts of the ambient light sensor may be mounted to corresponding contacts on the surface of the substrate layer. The substrate layer may be a thin-film transistor layer in a liquid crystal display or other display layer.

Further features of the invention, its nature and various advantages will be more apparent from the accompanying drawings and the following detailed description of the preferred embodiments.

DETAILED DESCRIPTION

Figure 1:
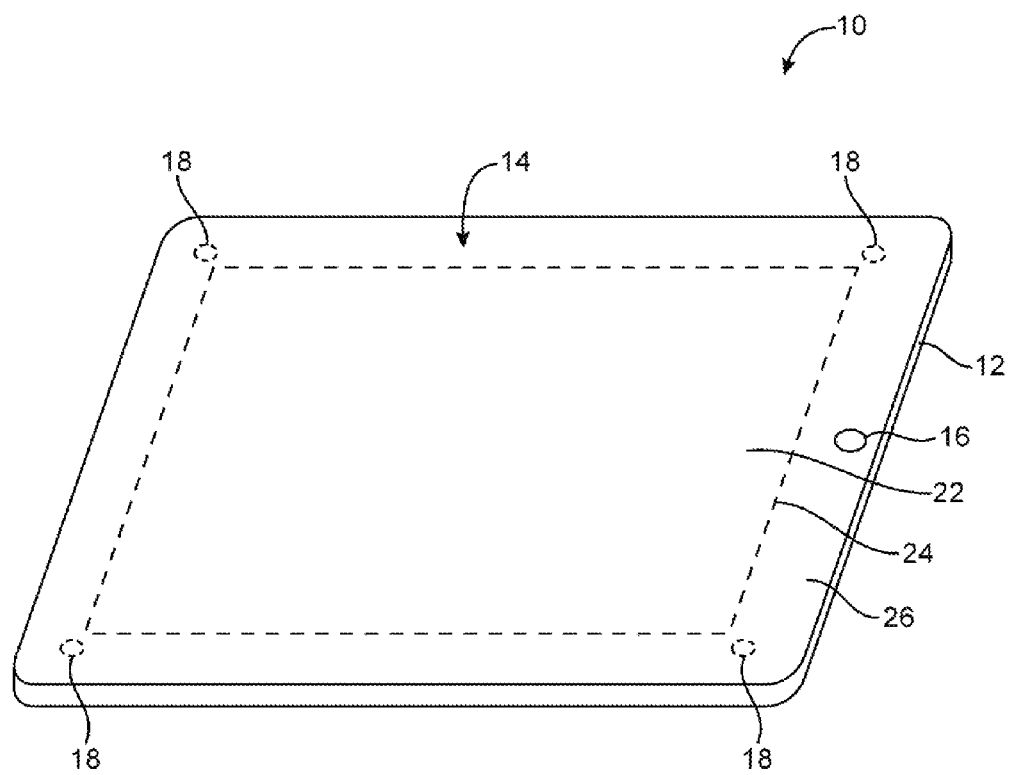
FIG. 1 is a perspective view of an illustrative electronic device with ambient light sensor structures in accordance with an embodiment of the present invention.

Electronic devices such as device 10 of FIG. 1 may be provided with an ambient light sensor system. The ambient light sensor system may use readings from one or more ambient light sensors to determine the brightness level of the environment ambient. Ambient brightness level information may be used by the electronic device in controlling display brightness. For example, in response to determining that ambient light levels are high, an electronic device may increase display brightness to ensure that images on the display remain visible to the user.

Device 10 of FIG. 1 may be a portable computer, a tablet computer, a computer monitor, a handheld device, global positioning system equipment, a gaming device, a cellular telephone, portable computing equipment, or other electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials.

Housing 12 may be formed using an unibody configuration in which some or all of housing 12 is machined or molded as a single structure or may be formed using multiple structures (e.g., an internal frame structure, one or more structures that form exterior housing surfaces, etc.).

In some configurations, housing 12 may be formed using front and rear housing structures that are substantially planar. For example, the rear of device 10 may be formed from a planar housing structure such as a planar glass member, a planar plastic member, a planar metal structure, or other substantially planar structure. The edges (sidewalls) of housing 12 may be straight (vertical) or may be curved (e.g., housing 12 may be provided with sidewalls formed from rounded extensions of a rear planar housing wall).

As shown in FIG. 1, the front of device 10 may include a display such as display 14. The surface of display 14 may be curved or planar. With one suitable arrangement, the surface of display 14 may be covered with a cover layer. The cover layer may be formed from a layer of clear glass, a layer of clear plastic, or other transparent materials (e.g., materials that are transparent to visible light and that are generally transparent to infrared light). The cover layer that covers display 14 may sometimes be referred to as a display cover layer, display cover glass, or plastic display cover layer.

Display 14 may, for example, be a touch screen that incorporates capacitive touch electrodes or a touch sensor formed using other types of touch technology (e.g., resistive touch, light-based touch, acoustic touch, force-sensor-based touch, etc.). Display 14 may include image pixels formed from light-emitting diodes (LEDs), organic LEDs (OLEDs), plasma cells, electronic ink elements, liquid crystal display (LCD) components, or other suitable image pixel structures.

Display 14 may have an active region and an inactive region. Active region 22 of display 14 may lie within rectangular boundary 24. Within active region 22, display pixels such as liquid crystal display pixels or organic light-emitting diode display pixels may display images for a user of device 10. Active display region 22 may be surrounded by an inactive region such as inactive region 26. Inactive region 26 may have the shape of a rectangular ring surrounding active region 22 and rectangular boundary 24 (as an example). To prevent a user from viewing internal device structures under inactive region 26, the underside of the cover layer for display 14 may be coated with an opaque masking layer in inactive region 26. The opaque masking layer may be formed from a layer of ink (e.g., black or white ink or ink of other colors), a layer of plastic, or other suitable opaque masking material.

Device 10 may include input-output ports, buttons, sensors, status indicator lights, speakers, microphones, and other input-output components. As shown in FIG. 1, for example, device 10 may include one or more openings in inactive region 26 of display 14 to accommodate buttons such as button 16. Device 10 may also have openings in other portions of display 14 and/or housing 12 to accommodate input-output ports, speakers, microphones, and other components.

Ambient light sensors may be mounted at any locations within device 10 that are potentially exposed to ambient light. For example, one or more ambient light sensors may be mounted behind openings or other windows in housing 12 (e.g., clear windows or openings in a metal housing, clear windows or openings in a plastic housing, etc.). With one suitable arrangement, one or more ambient light sensors may be formed in device 10 on portions of display 14. For example, one or more ambient light sensors may be mounted to a thin-film transistor layer or other display layer that is located under a display cover layer in inactive region 26 of display 14, as shown by illustrative ambient light sensor locations 18 in FIG. 1.

Ambient light sensors may be mounted under ambient light sensor windows in the opaque masking layer in inactive region 26 or may be mounted in other locations in device 10 that are exposed to ambient light. In configurations in which ambient light sensors are mounted under region 26 of display 14, ambient light sensor windows for the ambient light sensors may be formed by creating circular holes or other openings in the opaque masking layer in region 26. Ambient light sensor windows may also be formed by creating localized regions of material that are less opaque than the remaining opaque masking material or that otherwise are configured to allow sufficiently strong ambient light signals to be detected. For example, ambient light sensor windows may be created by locally thinning portions of an opaque masking layer or by depositing material in the ambient light sensor windows that is partly transparent. During operation, ambient light from the exterior of device 10 may pass through the ambient light sensor windows to reach associated ambient light sensors in the interior of device 10.

The ambient light sensors that are used in device 10 may be formed from silicon or other semiconductors. Ambient light sensors may be mounted on one or more substrates within device 10. With one suitable arrangement, ambient light sensors are formed from a semiconductor such as silicon and are mounted on a substrate layer that is formed from one of the layers in display 14. Other types of ambient light sensors and/or mounting arrangements may be used if desired. The use of silicon ambient light sensors that are mounted on a display substrate layer is merely illustrative.

Figure 2:
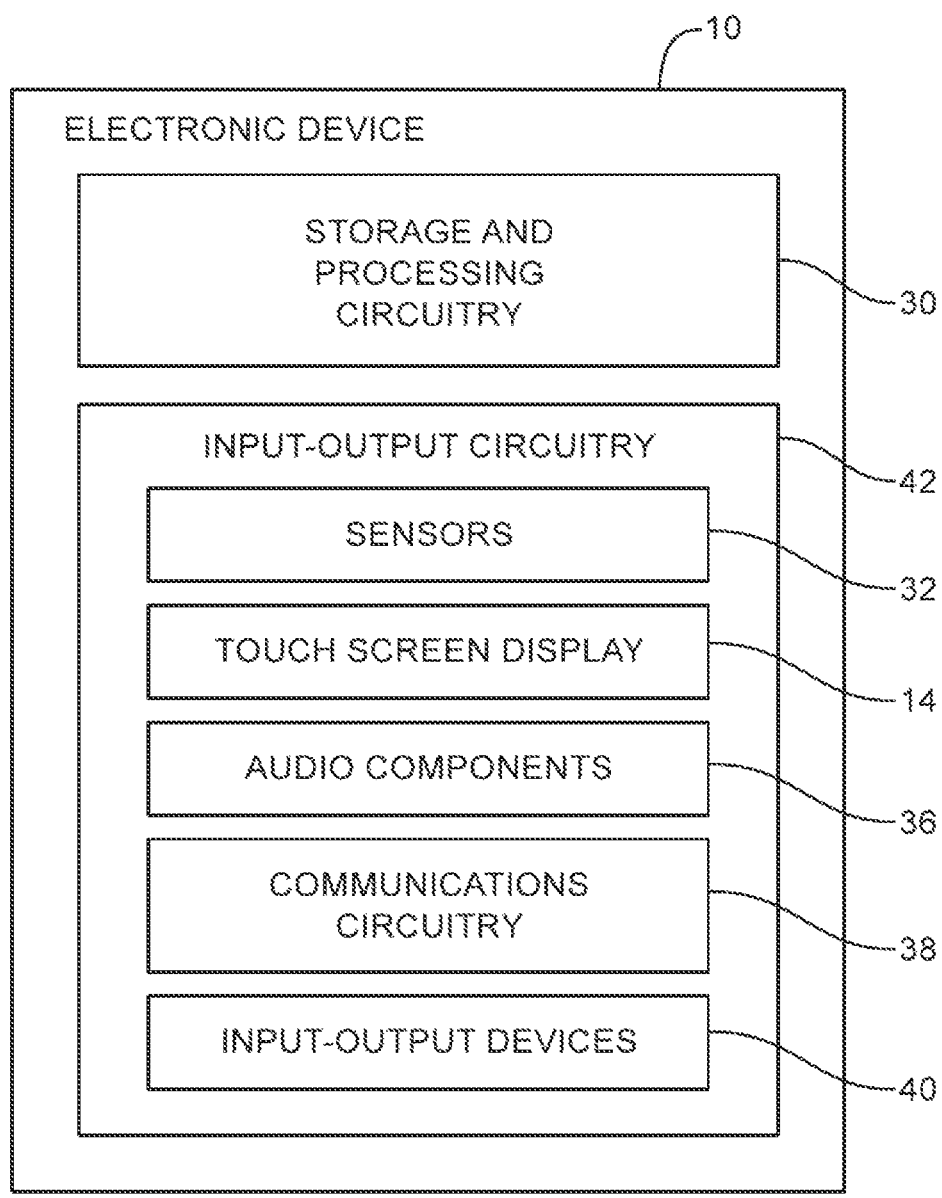
FIG. 2 is a schematic diagram of an illustrative electronic device with ambient light sensor structures in accordance with an embodiment of the present invention.

A schematic diagram of an illustrative electronic device such as electronic device 10 of FIG. 1 is shown in FIG. 2. As shown in FIG. 2, electronic device 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of device 10. This processing circuitry may be based on one or more microprocessors, microcontrollers, digital signal processors, baseband processors, power management units, audio codec chips, application specific integrated circuits, display driver integrated circuits, etc.

Storage and processing circuitry 30 may be used to run software on device 10 such as internet browsing applications, voice-over-internet-protocol (VOIP) telephone call applications, email applications, media playback applications, operating system functions, etc. The software may be used to implement control operations such as real time display brightness adjustments or other actions taken in response to measured ambient light data. Circuitry 30 may, for example, be configured to implement a control algorithm that controls the gathering and use of ambient light sensor data from ambient light sensors located in regions such as regions 18 of FIG. 1. Arrangements for device 10 that include a single ambient light sensor may reduce cost and complexity. Arrangements for device 10 that include multiple ambient light sensors may allow control circuitry 30 to discard or otherwise diminish the impact of ambient light sensor data that is gathered from ambient light sensors that are shadowed (and that are therefore producing erroneous or less valuable light readings).

Input-output circuitry 42 may be used to allow data to be supplied to device 10 and to allow data to be provided from device 10 to external devices. Input-output circuitry 42 may include sensors 32. Sensors 32 may include ambient light sensors, proximity sensors, touch sensors (e.g., capacitive touch sensors that are part of a touch screen display or that are implemented using stand-alone touch sensor structures), accelerometers, and other sensors.

Input-output circuitry 42 may also include one or more displays such as display 14. Display 14 may be a liquid crystal display, an organic light-emitting diode display, an electronic ink display, a plasma display, a display that uses other display technologies, or a display that uses any two or more of these display configurations. Display 14 may include an array of touch sensors (i.e., display 14 may be a touch screen). The touch sensors may be capacitive touch sensors formed from an array of transparent touch sensor electrodes such as indium tin oxide (ITO) electrodes or may be touch sensors formed using other touch technologies (e.g., acoustic touch, pressure-sensitive touch, resistive touch, etc.).

Audio components 36 may be used to provide device 10 with audio input and output capabilities. Examples of audio components that may be included in device 10 include speakers, microphones, buzzers, tone generators, and other components for producing and detecting sound.

Communications circuitry 38 may be used to provide device 10 with the ability to communicate with external equipment. Communications circuitry 38 may include analog and digital input-output port circuitry and wireless circuitry based on radio-frequency signals and/or light.

Device 10 may also include a battery, power management circuitry, and other input-output devices 40. Input-output devices 40 may include buttons, joysticks, click wheels, scrolling wheels, touch pads, key pads, keyboards, cameras, light-emitting diodes and other status indicators, etc.

A user can control the operation of device 10 by supplying commands through input-output circuitry 42 and may receive status information and other output from device 10 using the output resources of input-output circuitry 42. Using ambient light sensor readings from one or more ambient light sensors in sensors 32, storage and processing circuitry 30 can automatically take actions in real time such as adjusting the brightness of display 34, adjusting the brightness of status indicator light-emitting diodes in devices 40, adjusting the colors or contrast of display 34 or status indicator lights, etc.

Figure 3:
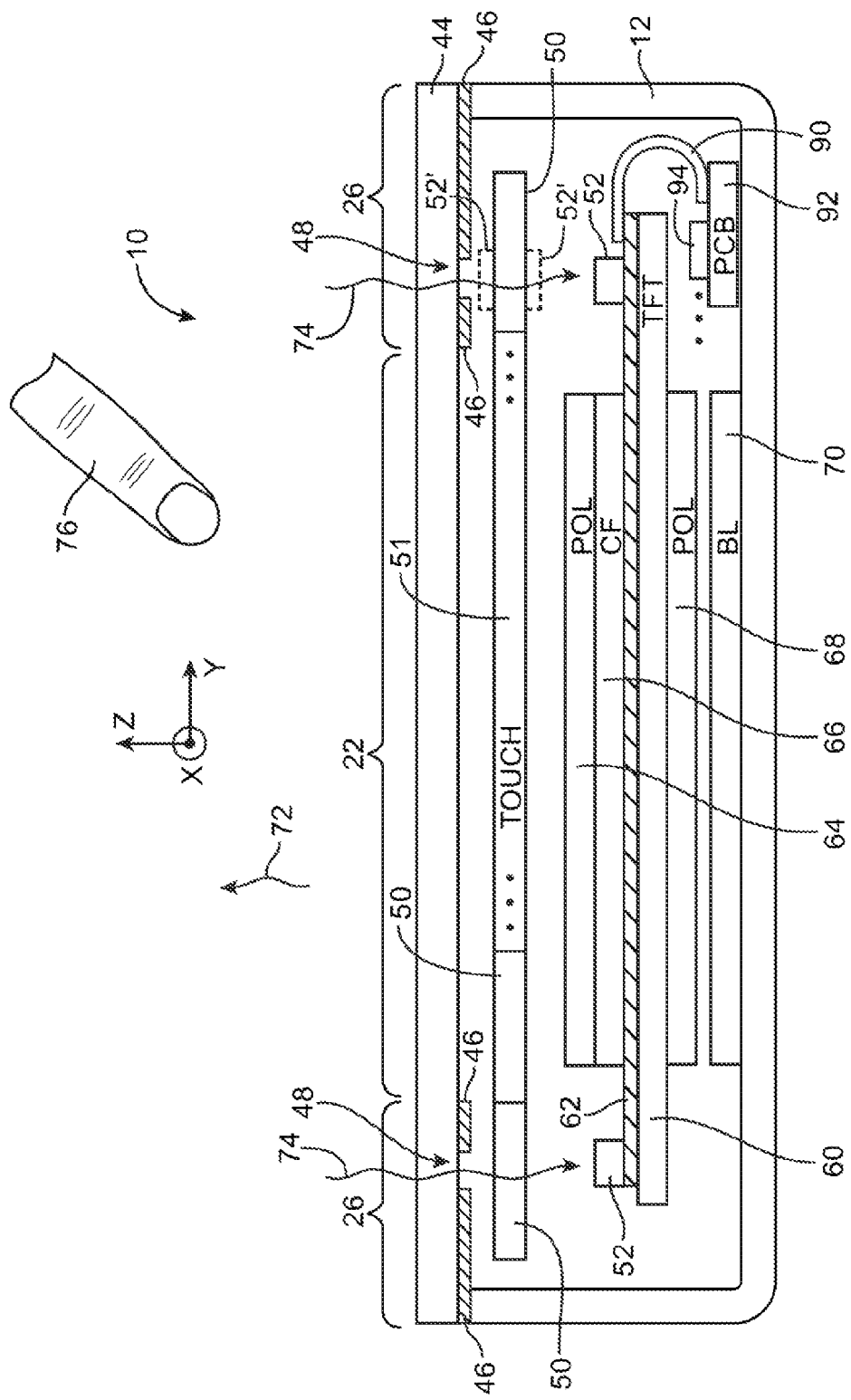
FIG. 3 is a cross-sectional side view of an illustrative electronic device having a display layer such as a thin-film-transistor layer with ambient light sensor structures in accordance with an embodiment of the present invention.

FIG. 3 is a cross-sectional side view of device 10. As shown in FIG. 3, device 10 may include a display such as display 14. Display 14 may have a cover layer such as cover layer 44. Cover layer 44 may be formed from a layer of glass, a layer of plastic, or other transparent material. If desired, the functions of cover layer 44 may be performed by other display layers (e.g., polarizer layers, anti-scratch films, color filter layers, etc.). The arrangement of FIG. 3 is merely illustrative.

Display structures that are used in forming images for display 14 may be mounted under active region 22 of display 14. In the example of FIG. 3, display 14 has been implemented using liquid crystal display structures. If desired, display 14 may be implemented using other display technologies. The use of a liquid crystal display in the FIG. 3 example is merely illustrative.

The display structures of display 14 may include a touch sensor array such as touch sensor array 51 for providing display 14 with the ability to sense input from an external object such as external object 76 when external object 76 is in the vicinity of a touch sensor on array 51. With one suitable arrangement, touch sensor array 51 may be implemented on a clear dielectric substrate such as a layer of glass or plastic and may include an array of indium tin oxide electrodes or other clear electrodes such as electrodes 50. The electrodes may be used in making capacitive touch sensor measurements.

Display 14 may include a backlight unit such as backlight unit 70 for providing backlight 72 that travels vertically upwards in dimension Z through the other layers of display 14. The display structures may also include upper and lower polarizers such as lower polarizer 68 and upper polarizer 64. Color filter layer 66 and thin-film transistor layer 60 may be interposed between polarizers 68 and 64. A layer of liquid crystal material may be placed between color filter layer 66 and thin-film transistor layer 60.

Color filter layer 66 may contain a pattern of colored elements for providing display 14 with the ability to display colored images. Thin-film transistor layer 60 may include pixel structures for applying localized electric fields to the liquid crystal layer. The localized electric fields may be generated using thin-film transistors and associated electrodes that are formed on a clear substrate such as a glass or plastic substrate. The electrodes and other conductive structures on thin-film transistors layer 60 may be formed from metal (e.g., aluminum) and transparent conductive material such as indium tin oxide. In the FIG. 3 example, thin-film transistors (e.g., polysilicon transistors or amorphous silicon transistors) and associated conductive patterns are shown as structures 62.

One or more ambient light sensors 52 may be provided in device 10. As shown in FIG. 3, ambient light sensors 52 may be mounted within device 10 by mounting ambient light sensors 52 to traces in structures 62 on thin-film transistor layer 60. If desired, ambient light sensors 52 may be mounted on other layers of display 14. For example, dashed lines 52' show how ambient light sensors may be mounted to a display layer such as touch sensor layer 51. Ambient light sensors in device 10 may also be mounted to cover layer 44, a polarizer layer, a color filter layer, a backlight structure layer, or any other suitable display layer. Ambient light sensors in device 10 may also be mounted on printed circuit board substrates (e.g. flexible printed circuits and/or rigid printed circuit boards), if desired. Illustrative configurations in which ambient light sensors 52 are mounted on thin-film transistor layer 60 are sometimes described herein as an example.

Indium tin oxide traces or other conductive patterned traces that are formed on thin-film transistor layer 60 may form electrical paths that are connected to leads in ambient light sensors 52. For example, one or more contacts such as gold pads or pads formed from other metals may be attached to indium tin oxide traces or metal traces using anisotropic conductive film (ACF) or other conductive adhesive. Solder connections, welds, connections formed using connectors, and other electrical interconnect techniques may be used to mount ambient light sensors 52 to thin-film transistor layer 60 if desired.

An opaque masking layer such as opaque masking layer 46 may be provided in inactive region 26. The opaque masking layer may be used to block internal device components from view by a user through peripheral edge portions of clear display cover layer 44. The opaque masking layer may be formed from black ink, black plastic, plastic or ink of other colors, metal, or other opaque substances. Ambient light sensor windows such as windows 48 may be formed in opaque masking layer 46. For example, circular holes or openings with other shapes may be formed in layer 46 to serve as ambient light sensor windows 48. Ambient light sensor windows 48 may, if desired, be formed in locations such as locations 18 of FIG. 1.

If desired, a flexible printed circuit ("flex circuit") cable such as cable 90 may be used to interconnect traces 62 on thin-film transistor layer 60 to additional circuitry in device 10 (e.g., storage and processing circuitry 30 of FIG. 2). Flex circuit cable 90 may, for example, be used to interconnect ambient light sensors 52, a driver integrated circuit on thin-film transistor layer 60, and thin-film transistor circuitry on thin-film transistor layer 60 to circuitry on a substrate such as printed circuit 92. The circuitry on substrate 92 may include integrated circuits and other components 94 (e.g., storage and processing circuitry 30 of FIG. 2).

During operation of device 10, ambient light 74 may pass through ambient light sensor windows 48 and may be detected using ambient light sensors 52. Signals from ambient light sensors 52 may be routed to analog-to-digital converter circuitry that is implemented within the silicon substrates from which ambient light sensors 52 are formed, to analog-to-digital converter circuitry that is formed on thin-film-transistor layer 60 or that is formed in an integrated circuit that is mounted to thin-film transistor layer 60, or to analog-to-digital converter circuitry and/or other control circuitry located elsewhere in device 10 such as one or more integrated circuits in storage and processing circuitry 30 of FIG. 2 (e.g., integrated circuits containing analog-to-digital converter circuitry for digitizing analog ambient light sensor signals from sensors 52 such as integrated circuits 94 on substrate 92).

If desired, an ambient light sensor may be implemented as part of a silicon device that has additional circuitry (i.e., ambient light sensors 52 may be implemented as integrated circuits). An ambient light sensor with this type of configuration may be provided with built-in analog-to-digital converter circuitry and communications circuitry so that digital light sensor signals can be routed to a processor using a serial interface or other digital communications path.

Figure 4:
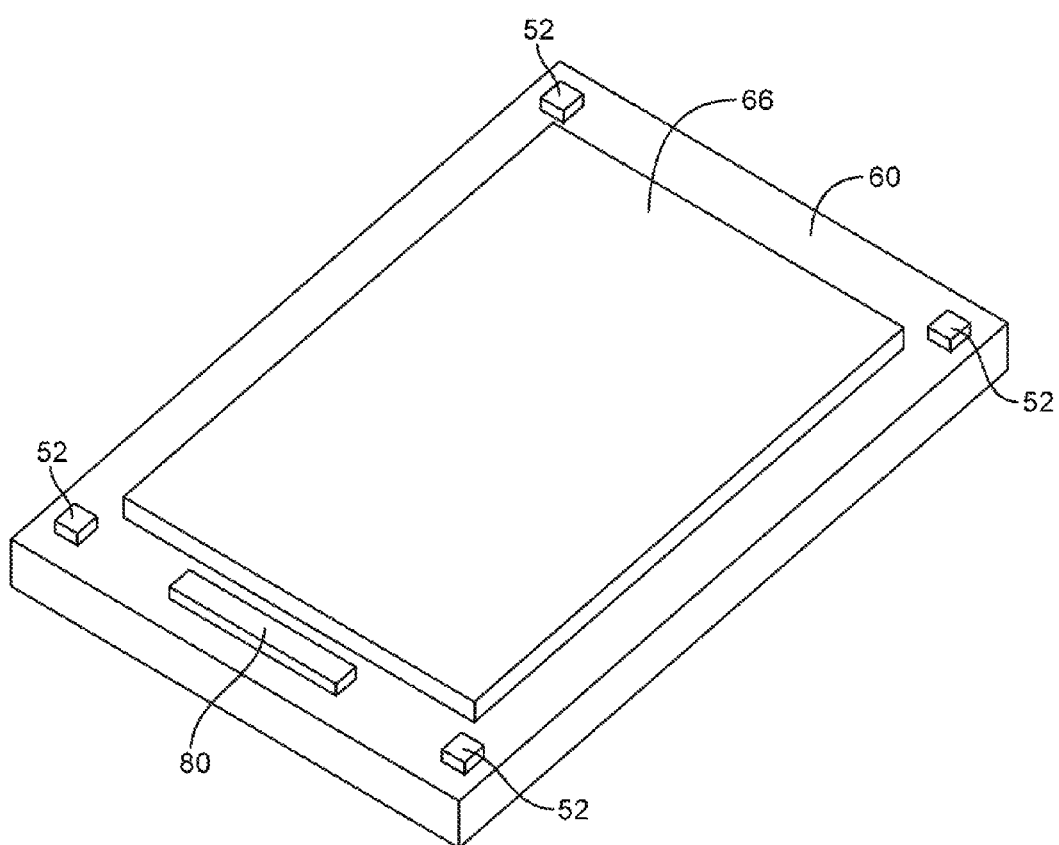
FIG. 4 is a perspective view of illustrative display structures such as a thin-film transistor layer with ambient light sensors and an associated color filter layer in accordance with an embodiment of the present invention.

Ambient light sensor signal routing paths on thin-film-transistor layer 60 may be formed using indium tin oxide conductors or other conductive paths formed on the upper surface of thin-film-transistor layer 60 (as examples). By mounting ambient light sensors 52 on structures in device 10 such as display layers (e.g., thin-film-transistor substrate layer 60), the cost and complexity of implementing multiple ambient light sensors within device 10 may be minimized while minimizing the amount of volume consumed within device 10. As shown in FIG. 4, ambient light sensors 52 may, if desired, be mounted in the corners of thin-film transistor layer 60, where there is generally unused space available. Components such as display driver integrated circuit 80 may also be mounted on thin-film transistor layer 60.

Ambient light sensors 52 may be formed from packaged devices such as surface mount technology (SMT) devices with contacts for mounting to a display layer. Ambient light sensors may also be formed from thin-film structures that are deposited and patterned on a display layer. Configurations in which ambient light sensors 52 are formed from a semiconductor substrate such as a silicon substrate (e.g., a silicon integrated circuit substrate) of the type that can be mounted directly to a display layer without an intervening SMT package are described herein as an example.

With one suitable mounting arrangement, components such as display driver integrated circuit 80 and ambient light sensors 52 formed from silicon substrates may be mounted on a substrate such as thin-film transistor layer 60 using chip-on-glass (COG) technology. Ambient light sensors 52 may, for example, be formed from silicon die (chips) in which sensor structures and contacts (leads) are formed on the backside surfaces of the chips. During mounting, the backside contacts of the chips can be attached to thin-film transistor layer 60, so that the contacts on the backsides of the chips form mechanical and electrical connections with corresponding conductive pads and lines (e.g., patterned conductive traces) on the upper surface of the thin-film transistor layer. Anisotropic conductive film, other conductive adhesives, solder, welds, or other electrical connection structures may be used in connecting the ambient light sensor contacts to mating conductive lines on thin-film transistor substrate 60.

It is generally desirable for ambient light sensors to exhibit sensitivity to the visible portion of the light spectrum, mimicking the response of a human eye. Light sensor configurations suitable for use as ambient light sensors are sometimes referred to as human eye response sensors. Human eye response sensors can be formed using optical filters or other structures that help reduce sensitivity outside of the visible portion of the light spectrum (i.e., in the infrared portion of the spectrum). With one suitable arrangement, which is sometimes described herein as an example, ambient light sensors 52 may be implemented using a dual sensor architecture. With this type of configuration, each ambient light sensor 52 may have a first sensor that is sensitive to visible light and infrared light and a second sensor that is sensitive primarily to infrared light. The signals measured using the infrared sensor portion can be subtracted from the signals measured using the visible and infrared sensor portion to produce a signal output for the sensor that is primarily responsive to visible light.

Figure 5:
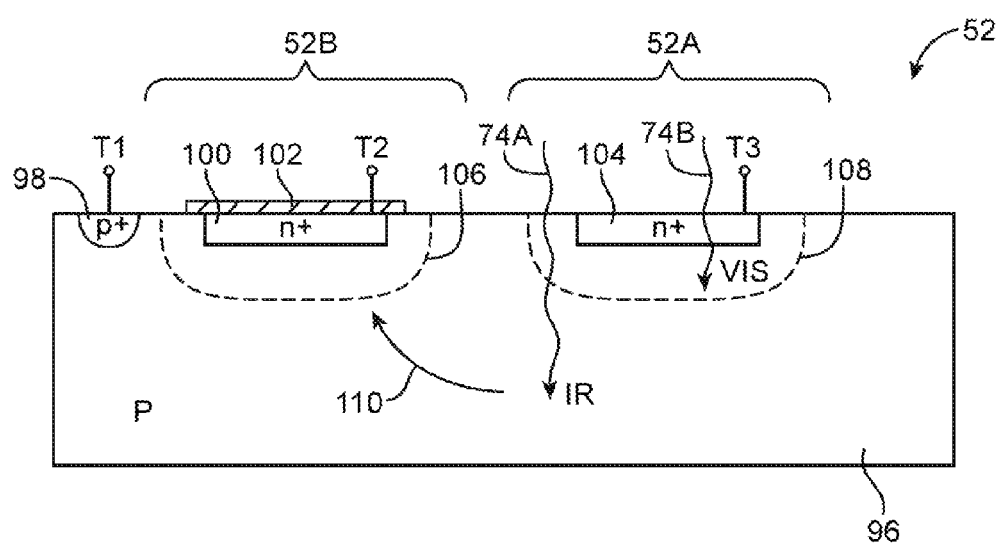
FIGS. 5 and 6 are cross-sectional side views of illustrative ambient light sensors in accordance with embodiments of the present invention.
Figure 6:
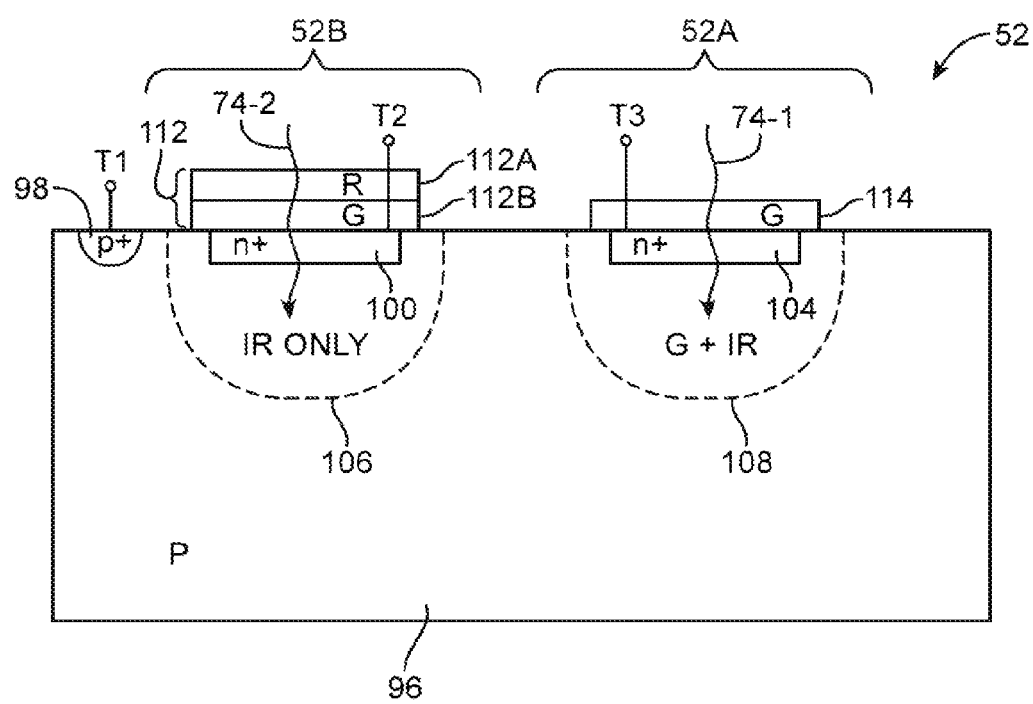

Illustrative dual-sensor-element ambient light sensors are shown in FIGS. 5 and 6.

In the example of FIG. 5, ambient light sensor 52 has been formed from silicon substrate 96 and includes first sensor element 52A and second sensor element 52B. Substrate 96 may have a first doping type (e.g., p-type). Heavily doped region 98 (e.g., a p+ region) may be used to allow terminal T1 to form an ohmic contact to region 98. Sensor elements 52A and 52B may be based on reverse-biased p-n junctions (i.e., reverse-biased diodes). Sensor element 52A may have a terminal such as terminal T3 that is coupled to n-type region 104 and sensor element 52B may have a terminal such as terminal T2 that is coupled to n-type region 100. By reverse biasing sensor elements 52A and 52B, depletion regions 108 and 106 can be formed in substrate 96.

Sensor 52B may be provided with an opaque layer such as metal layer 102 that blocks incoming light. In sensor 52A, visible light 74B penetrates substrate 96 to a depth that is less than the depth of depletion region 108. Infrared light 74A tends to penetrate farther into substrate 96 and therefore generates carriers outside of depletion region 108. These carriers tend to diffuse towards depletion region 106 of sensor element 52B, as indicated by line 110. Sensor element 52B therefore primarily generates signals across terminals T2 and T1 that are responsive to infrared light. The infrared light signal that is produced by element 52B can be subtracted from the signals generated by sensor element 52A across terminals T1 and T3 to produce a human eye response signal (i.e., a signal responsive primarily to the magnitude of incident visible light). If desired, the doping types used in example of FIG. 5 can be reversed (e.g., p-type used for n-type and vice versa).

In the example of FIG. 6, first sensor portion 42A has been provided with an optical filter (e.g., green filter 114) that allows green visible light and infrared light to enter depletion region 108, as indicated by light 74-1. Second sensor portion 42B has been provided with optical filter structures 112 such as red filter structure 112A and green filter structure 112B that block all visible light but that pass infrared light, as indicated by light 74-2. Using this type of configuration, sensor element 52A may produce a signal that is proportional to visible and infrared light, whereas sensor element 52B may produce a signal that is proportional to only infrared light. As with ambient light sensor 52 of FIG. 5, the infrared light signal that is produced across terminals T1 and T2 by element 52B of ambient light sensor 52 of FIG. 6 can be subtracted from the signals generated by sensor element 52A across terminals T1 and T3 of ambient light sensor 52 of FIG. 6 to produce a human eye response signal (i.e., a signal responsive primarily to the magnitude of incident visible light).

Figure 7:
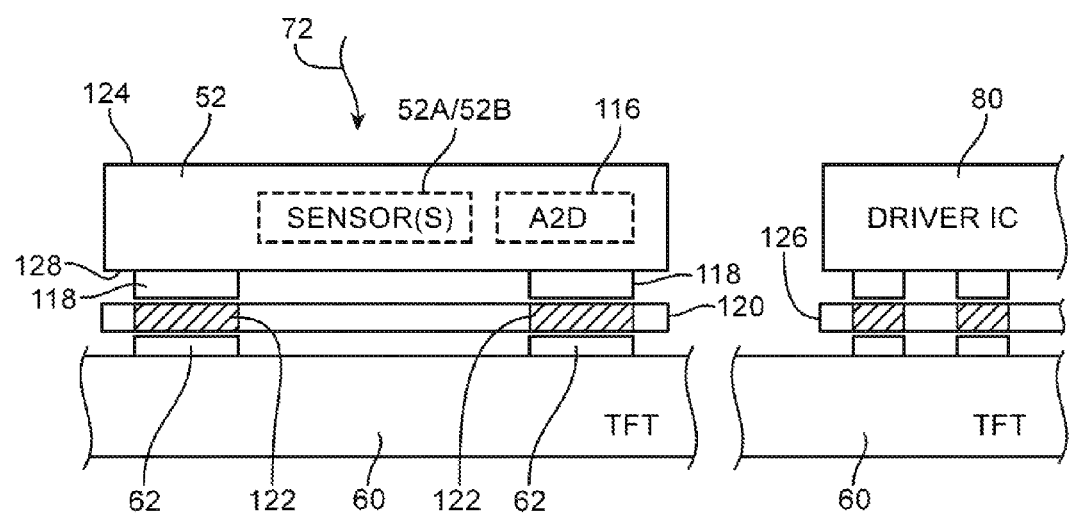
FIG. 7 is a cross-sectional side view of a portion of a display showing how an ambient light sensor may be mounted on a display layer such as a thin-film transistor substrate layer in accordance with an embodiment of the present invention.

Other types of ambient light sensor designs may be used if desired. The examples of FIGS. 5 and 6 are merely illustrative. Moreover, additional circuitry such as sensor signal processing circuitry (e.g., amplifier circuitry), analog-to-digital converter circuitry, and communications circuitry may, if desired, be incorporated onto the same substrate as ambient light sensor components such as sensor elements 52A and 52B (i.e., ambient light sensors 52 may be formed from integrated circuit "chips" that optionally include sensor signal processing circuitry). FIG. 7 is a cross-sectional side view of an interior portion of device 10 showing how ambient light sensor 52 may include sensor structures (e.g., photodiode elements such as sensor elements 52A and 52B of FIGS. 5 and 6) and additional circuitry 116. Additional circuitry 116 may include amplifier circuitry, analog-to-digital converter circuitry, communications circuitry, digital processing circuitry, or other circuitry for handling light sensor data.

As shown in FIG. 7, ambient light sensor 52 may have opposing first and second surfaces such as surfaces 124 and 128. Doped regions such as regions 98, 100, and 104 of FIGS. 5 and 6 may be formed adjacent to surface 124 during semiconductor fabrication operations, so surface 124 is sometimes referred to as the frontside surface of ambient light sensor 52 and surface 128 is sometimes referred to as the backside surface of ambient light sensor 52. As shown by incoming light 72, ambient light sensor 52 may be configured to receive light signals that pass through frontside surface 124. Configurations in which light 72 is received using backside illumination sensors may also be used if desired. Illustrative arrangements in which light 72 is detected using frontside illumination sensors are described herein as an example.

Ambient light sensor 52 may have contacts such as backside contacts 118. Contacts 118, which are sometimes referred to as leads, terminals, or contacts pads, may be used to mount ambient light sensor 52 to a suitable substrates in device 10. Ambient light sensor 52 (i.e., the silicon "chip" from which sensor 52 is formed in the example of FIG. 7) may, for example, be mounted to a display layer such as thin-film transistor substrate 60. Because substrate 60 may be formed from glass, an arrangement of this type may sometimes be referred to as a chip on glass (COG) mounting configuration.

Using a chip on glass mounting arrangement that permits ambient light sensor 52 to be mounted directly to thin-film transistor layer 60 while receiving frontside illumination (incident ambient light 72), may facilitate formation of compact and reliable ambient light sensor capabilities for device 10 without undesirably increasing cost or complexity for device 10. If desired, additional components such as driver integrated circuit 80 may also be mounted using chip on glass mounting techniques (e.g., by flipping driver integrated circuit 80 so that contacts on the frontside surface of driver integrated circuit 80 are mounted to the surface of substrate 60).

Thin-film transistor substrate 60 may include patterned conductive traces 62. Traces 62 may include contact pads and other features that are configured to mate with corresponding contact pads such as contacts 118 on ambient light sensor 52 and contacts in driver integrated circuit 80. Traces 62 may be electrically connected to contacts on mounted components such as ambient light sensor 52 and driver integrated circuit 80 using solder, welds, connectors, anisotropic conductive film or other conductive adhesive, or other electrically conducting attachment mechanisms. As shown in FIG. 7, for example, anisotropic conductive film 120 may be interposed between contacts 118 and traces 62. When pressure is applied to ambient light sensor 52, portions 122 of film 120 become conductive and cause each contact 118 to be shorted to a respective contact pad in traces 62 without becoming shorted to adjacent contacts. Anisotropic conductive film 126 may likewise be used in mounting driver integrated circuit 80 to thin-film transistor layer 60.

An illustrative process for forming an ambient light sensor suitable for chip-on-glass mounting and backside illumination is shown in FIGS. 8-14.

Figure 8:
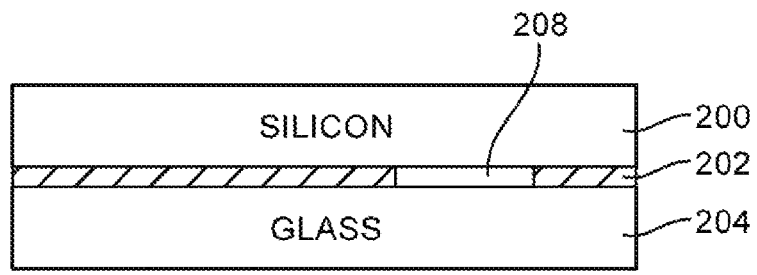
FIGS. 8, 9, 10, 11, 12, 13, and 14 are cross-sectional side views of ambient light sensor structures illustrating how an ambient light sensor may be formed using frontside-to-backside signal paths that are formed on sidewall portions of an ambient light sensor in accordance with an embodiment of the present invention.

Initially, light sensor structures and other integrated circuit structures (e.g., analog-to-digital converter circuitry, amplifier circuitry, communications circuitry, and other circuitry) may be formed on a semiconductor substrate such as silicon substrate 200 of FIG. 8. As part of the process of forming substrate 200, patterned conductive materials such as patterned metal traces 202 may be formed on the surface of substrate 200. Following formation of the circuitry in substrate 200, substrate 200 may be bonded face down to a transparent glass carrier such as glass carrier 204 or other suitable transparent materials. There may be openings in metal traces 202, as illustrated by opening 208 of FIG. 8. In a completed ambient light sensor, opening 208 can allow incoming ambient light to reach sensors in substrate 200.

Figure 9:
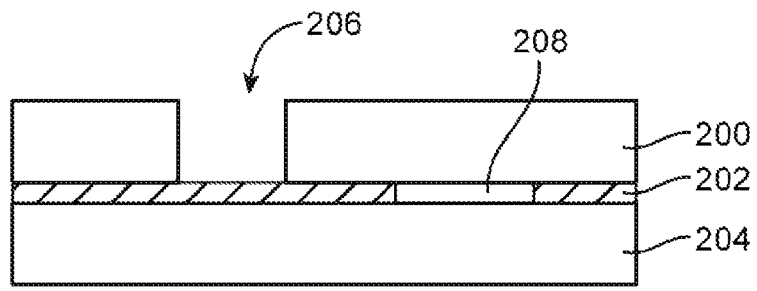

Following attachment of silicon substrate 200 to glass layer 204, openings such as opening 206 of FIG. 9 may be formed in silicon substrate 200. As an example, wet or dry etching techniques may be used to form opening 206 of FIG. 9. The etching process may favor etching of silicon over metal (i.e., metal layer 202 may serve as an etch stop at the bottom of opening 206).

Figure 10:
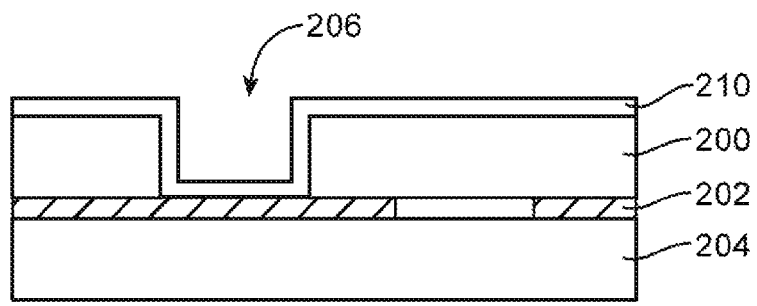

As shown in FIG. 10, an insulating layer such as insulating layer 210 may be formed over silicon substrate 200 and opening 206. Insulating layer 210 may be formed from silicon oxide, silicon nitride, silicon oxynitride, or other suitable insulating materials.

Figure 11:
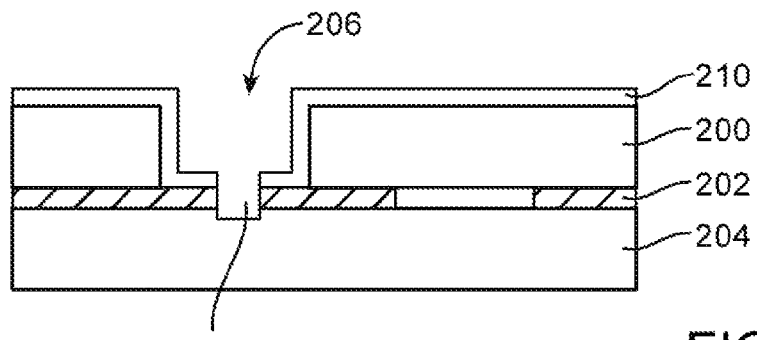

After layer 210 has been formed, a saw or other cutting tool may be used to form a groove such as groove 212 at the bottom of opening 206, as shown in FIG. 11. Groove 212 preferably penetrates through metal layer 202.

Figure 12:
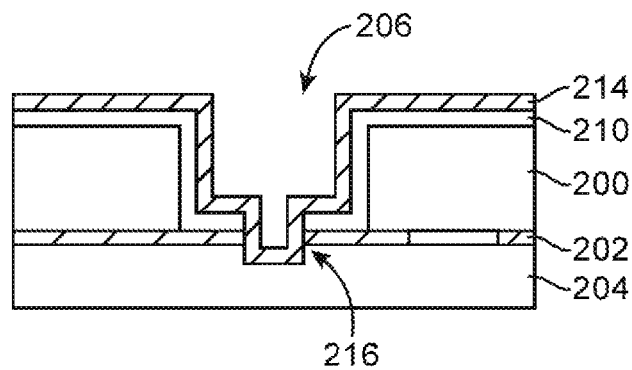

As shown in FIG. 12, a metal layer such as metal layer 214 may be formed in opening 206 and groove 212. Because groove 212 penetrates through metal layer 202, metal layer 214 becomes electrically shorted to layer 202 in regions such as region 216.

Figure 13:
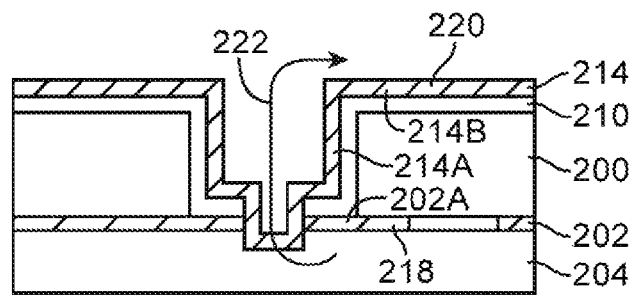

FIG. 13 shows how the electrical shorting path between layer 202 and 214 may be used to form a path such as path 222 for electrical signals from the frontside of silicon layer 202 (e.g., portion 218 of frontside metal layer 202) to the backside of silicon layer 202 (e.g., portion 220 of backside metal layer 214).

Figure 14:
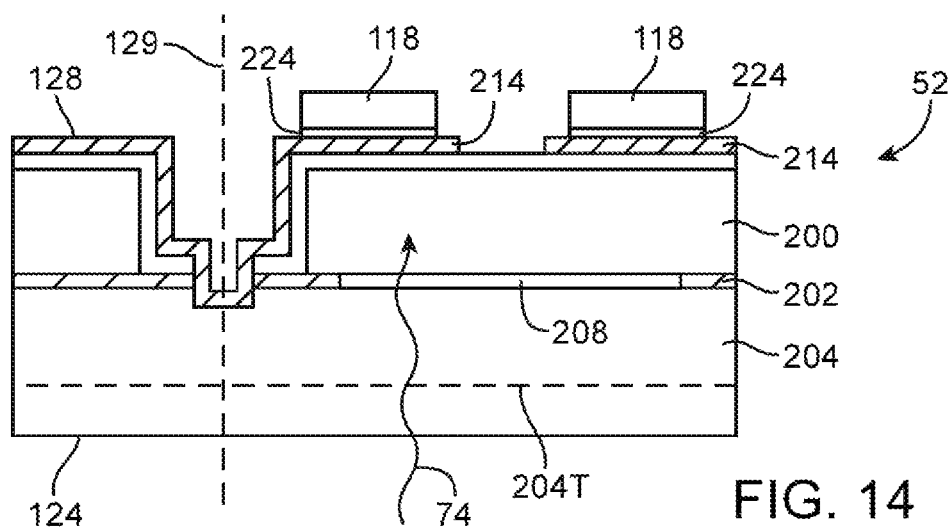

Following formation of frontside-to-backside conductive paths such as path 222 of FIG. 13, metal layer 214 may be patterned and contact structures may be deposited and patterned on layer 214 to form backside contacts 118, as shown in FIG. 14. Individual ambient light sensors may be formed by dividing the structures of FIG. 14 along locations such as the location indicated by dashed line 129.

Contacts 118 of ambient light sensor 52 of FIG. 14 may, for example, be formed using a photoresist lift-off process or may be patterned using a dielectric layer as an etching mask (as examples). If desired, an adhesion layer such as layer 224 may be formed under the metal or other conductive material that is used in forming contacts 118. With one suitable arrangement, contacts 118 may be formed from a metal such as gold, optional adhesion layer 224 may be formed from a metal such as tungsten, and metal layers 214 and 202 may be formed from aluminum (as an example). Other conductive materials may be used in forming conductive frontside-to-backside paths such as path 222 and backside contacts such as contacts 118 for ambient light sensor 52 if desired. The use of materials such as gold, tungsten, and aluminum is merely illustrative.

Light ray 74 of FIG. 14 illustrates how ambient light may pass through glass layer 204 and opening 208 in metal layer 202 into silicon layer 200 for detection by sensor elements implemented in layer 200. During operation, sensor signals may be routed from the frontside surface of layer 200 (adjacent to metal layer 202) to backside surface contacts 118. If desired, glass layer 204 may be thinned prior to use, as illustrated by dashed line 204T.

Figure 15:
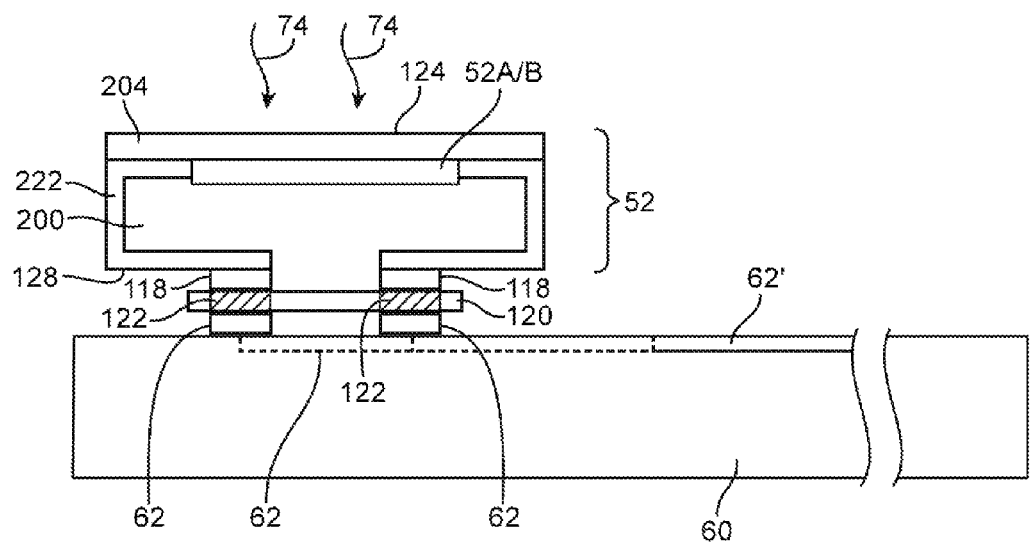
FIG. 15 is a cross-sectional side view of an illustrative ambient light sensor of the type shown in FIG. 14 mounted on a substrate such as a thin-film transistor substrate for a display in accordance with an embodiment of the present invention.

FIG. 15 is a side view of an ambient light sensor that has been formed using the approach of FIGS. 8-14 following attachment of the ambient light sensor to a substrate such as thin-film transistor substrate 60. As shown in FIG. 15, frontside 124 of ambient light sensor 52 is mounted face up and backside 128 of ambient light sensor 52 is mounted face down to the upper surface of thin-film transistor layer 60. In this configuration, backside contacts 118 of ambient light sensor 52 are mechanically and electrically connected to mating contacts formed from traces 62 on thin-film transistor substrate 60. Traces 62 may form electrical pathways with thin-film transistor structures such as thin-film transistors 62'.

Ambient light 74 may be received by sensor structures 52A/B of sensor 52. Sensor structures 52A/B may include filter structures that filter the incoming ambient light, as described in connection with layers 102, 112, and 114 of FIGS. 5 and 5.

Figure 16:
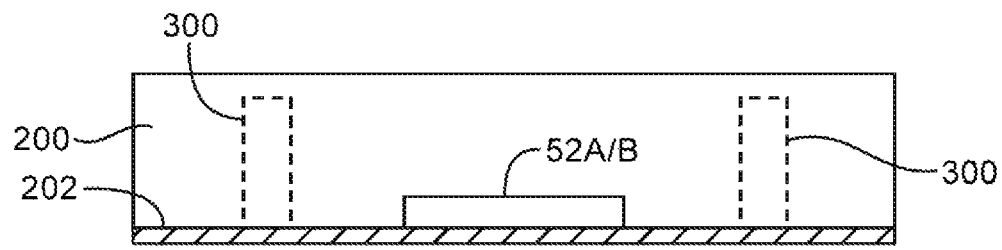
FIGS. 16, 17, and 18 are cross-sectional side views illustrating how an ambient light sensor with frontside-to-backside vias may be formed in accordance with an embodiment of the present invention.

In the illustrative configuration of FIG. 15, path 222 has been formed using metal layers such as metal layers 214 and 202 (see, e.g., FIG. 13). If desired, frontside-to-backside electrical paths may be formed using conductive vias. This type of approach is illustrated in FIGS. 16, 17, and 18.

Initially, silicon layer 200 may be processed to form sensor structures 52A/B (e.g., sensor elements such as elements 52A and 52B of FIGS. 5 and 6). Patterned traces such as traces 202 may be formed on the frontside of silicon layer 200. Optional via holes such as vias 300 may be etched in layer 200, as shown in FIG. 16.

Figure 17:
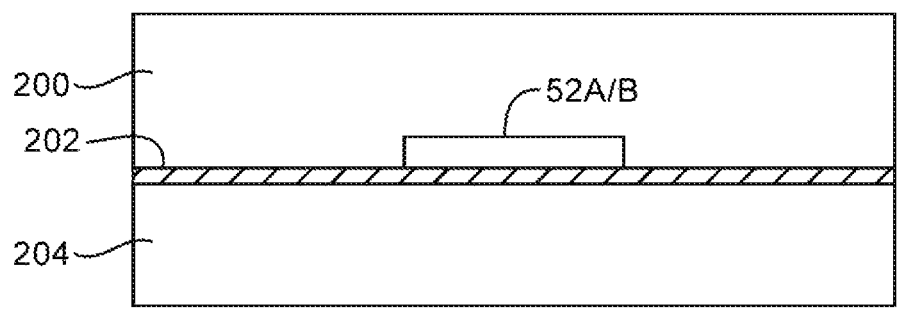
Figure 18:
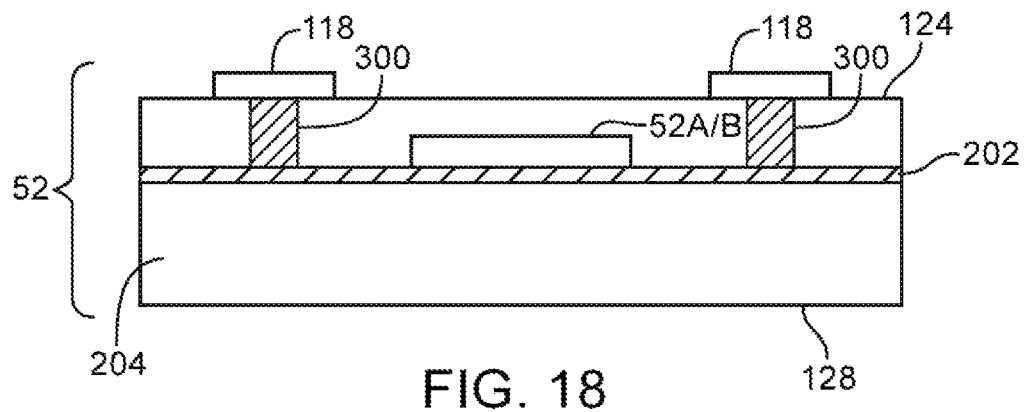

As shown in FIG. 17, layer 200 may be bonded to a transparent substrate such as glass carrier 204 or other suitable supporting layer.

Processing may be completed by thinning silicon layer 200 (and, if desired, layer 204) using polishing techniques or other thinning techniques. Vias 300 may be formed in the thinned silicon layer (if not previously formed and exposed by the thinning process). Following via hole formation, vias 300 may be filled with metal. Backside contacts 118 may then be formed, resulting in ambient light sensor 52 of FIG. 18. Ambient light sensor 52 of FIG. 18 may be mounted to a substrate in device 10 such as a glass or plastic transparent substrate layer in display 14.

Conventional processes for forming backside illumination image sensor arrays for digital cameras may involve bonding a silicon carrier wafer to the front side of an image sensor wafer on which an array of image sensor pixels have been formed, thinning the image sensor wafer while bonded to the carrier wafer, activating the backside surface (e.g., using plasma activation, chemical-mechanical polishing, etc.), applying an anti-reflection film coating to the backside of the image sensor wafer, and forming bond pads and color filter structures on the backside of the image sensor wafer. During operation of a conventional backside illumination image sensor array of this type, light that is incident on the backside on which the bond pads are formed and that has passed through the color filters on the backside of the image sensor array may be detected by the array of image sensor pixels.

With the process of FIGS. 15, 16, and 17, in contrast, a layer of transparent material such as glass 204 is bonded to silicon layer 200 rather than an opaque silicon carrier wafer. Moreover, the backside silicon layer 200 is not activated, is covered with gold pads 118 rather than commonly used aluminum bond pads, and may be substantially free of an antireflection film and color filters on the backside. During operation of the ambient light sensor of FIG. 17, light can reach the sensors on the front side of layer 200 through bonded glass layer 204 on the front side of the ambient light sensor (e.g., incident light may reach the sensors from a front side that is opposite to the backside on which gold pads 118 are formed), rather than through backside color filters as with a conventional backside illumination image sensor array.

The thickness of ambient light sensor 52 may be thinned to have a thickness of less than 1 mm, less than 500 microns, less than 300 microns, less than 150 microns, or other suitable thickness. The use of relatively thin thicknesses (vertical heights) for ambient light sensor 52 may facilitate mounting of ambient light sensor 52 within housing 12.

The foregoing is merely illustrative of the principles of this invention and various modifications can be made by those skilled in the art without departing from the scope and spirit of the invention.

What is claimed is:

1. An electronic device, comprising:
a display; and
an ambient light sensor having a frontside surface with light sensor structures configured to receive ambient light and having a backside surface with backside contacts that are mounted to associated contacts on at least part of the display, wherein the ambient light sensor comprises vias that form an electrical path between the frontside surface of the ambient light sensor and the backside surface of the ambient light sensor.

2. The electronic device defined in claim 1 wherein the display comprises a liquid crystal display having a thin-film transistor layer on which the associated contacts are formed and wherein ambient light sensor is mounted on the thin-film transistor layer by mounting the backside contacts to the associated contacts on the thin-film transistor layer.

3. The electronic device defined in claim 1 wherein the display comprises a touch sensor layer on which the associated contacts are formed and wherein the ambient light sensor is mounted to touch sensor layer by mounting the backside contacts to the associated contacts on the touch sensor layer.

4. The electronic device defined in claim 1 wherein the display comprises at least one transparent substrate layer on which the associated contacts are formed and wherein the ambient light sensor is mounted to transparent substrate layer by mounting the backside contacts to the associated contacts on the transparent substrate layer.

5. The electronic device defined in claim 1 wherein the display comprises a rectangular thin-film transistor layer having four corners and wherein the ambient light sensor is mounted in one of the four corners.

6. The electronic device defined in claim 5 further comprising at least one additional ambient light sensor mounted to the thin-film transistor layer in at least another one of the four corners.

7. The electronic device defined in claim 1 wherein the ambient light sensor is formed from an integrated circuit and wherein the integrated circuit includes analog-to-digital converter circuitry.

8. The electronic device defined in claim 1 wherein the backside contacts on the backside surface of the ambient light sensor comprise gold.

9. The electronic device defined in claim 1 further comprising conductive adhesive between the backside contacts on the backside surface of the ambient light sensor and the associated contacts on the display.

10. An electronic device, comprising:
a glass substrate having conductive traces; and
an ambient light sensor having contacts that are electrically connected to the traces, wherein the ambient light sensor comprises a semiconductor substrate having doped regions in a frontside surface through which ambient light is received and a backside surface on which the contacts are formed.

11. The electronic device defined in claim 10 wherein the glass substrate comprises a thin-film transistor layer in a liquid crystal display.

12. The electronic device defined in claim 11 wherein the semiconductor substrate comprises a layer of silicon, wherein the ambient light sensor comprises a layer of glass, and wherein ambient light is received by the layer of silicon through the layer of glass.

13. The electronic device defined in claim 10 further comprising conductive adhesive with which the contacts are connected to the traces.

14. An electronic device, comprising:
a display having at least one transparent display layer; and
at least one ambient light sensor formed from doped regions in a silicon substrate having first and second opposing surfaces, wherein the ambient light sensor receives light through the first surface and has contacts on the second surface of the silicon substrate and wherein the contacts are attached to conductive structures on the transparent display layer.

15. The electronic device defined in claim 14 further comprising conductive material with which the contacts are attached to the conductive structures, wherein the transparent display layer comprises thin-film transistors.

16. The electronic device defined in claim 15 wherein the display comprises a liquid crystal display, wherein the transparent display layer comprises a glass layer, and wherein the thin-film transistors and the conductive structures are formed on the glass layer.

17. The electronic device defined in claim 14 wherein the at least one ambient light sensor comprises a plurality of ambient light sensors that are formed from silicon substrates having contacts that are attached to the conductive structures on the transparent display layer, the electronic device further comprising a display cover layer having an opaque masking layer with a plurality of transparent ambient light sensor windows through which ambient light reaches the ambient light sensors.

* * * * *